G. BREWSTER.
Improvement in Pruning-Shears.
No. 130,274.
Patented Aug. 6, 1872.
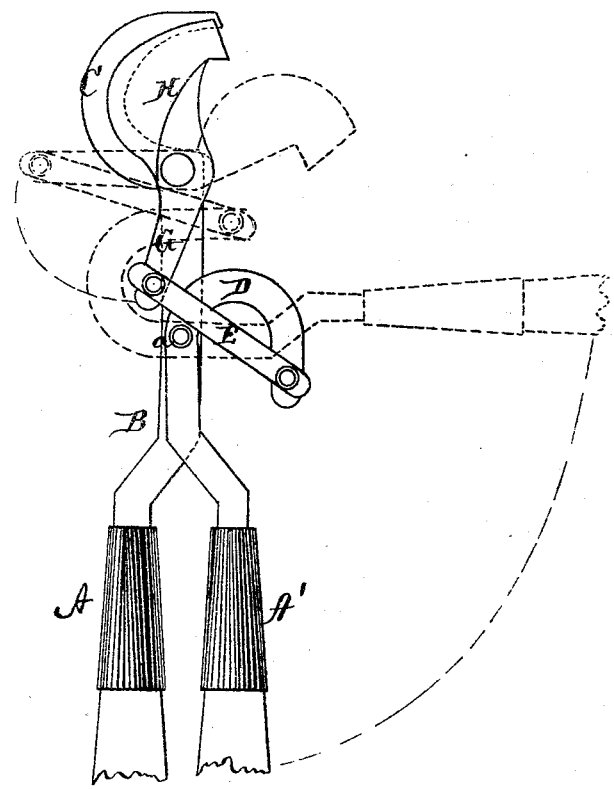

UNITED STATES PATENT OFFICE.

GEORGE BREWSTER, OF OTSEGO, MICHIGAN, ASSIGNOR OF TWO-THIRDS HIS RIGHT TO ROBERT B. WALLACE AND WILLIAM VANBLARCUM, OF SAME PLACE.

IMPROVEMENT IN PRUNING-SHEARS.

Specification forming part of Letters Patent No. 130,274, dated August 6, 1872.

*To all whom it may concern:*

Be it known that I, GEORGE BREWSTER, of Otsego, in the county of Allegan and in the State of Michigan, have invented certain new and useful Improvements in Pruning-Shears; and do hereby declare that the following is a full, clear, and exact description thereof, reference being had to the accompanying drawing and to the letters of reference marked thereon making a part of this specification.

The nature of my invention consists in the construction and arrangement of a "pruning-shear," as will be hereinafter more fully set forth.

In order to enable others skilled in the art to which my invention appertains to make and use the same, I will now proceed to describe its construction and operation, referring to the annexed drawing, which is a side view of my pruning-shears.

A A' are the two handles of my pruning-shear. To the handle A is firmly secured the shank B of the usual curved jaw C. To the handle A' is firmly secured a U-shaped lever, D, which is pivoted at $a$ to the shank B. The outer end of this lever is by a pivoted bar, E, connected with the end of the shank G of the cutting-blade H, and the same is pivoted to the jaw C of the base thereof.

The U-shaped lever D in its action is a perfect eccentric, increasing the power as the cut gets deeper into the wood; or, in other words, the power is increased as the shears close.

Having thus fully described my invention, what I claim as new, and desire to secure by Letters Patent, is—

The U-shaped lever D, in combination with the bar E, shank G, blade H, shank B, and blade C, all substantially as and for the purposes herein set forth.

In testimony that I claim the foregoing I have hereunto set my hand this 27th day of May, 1872.

GEORGE BREWSTER.

Witnesses:
WILLIAM CROSS,
OSCAR HARE.